United States Patent
Maltz et al.

(10) Patent No.: US 8,836,997 B2
(45) Date of Patent: Sep. 16, 2014

(54) METHOD AND SYSTEM FOR IMAGING DEVICE CHARACTERIZATION INCLUDING LOOK-UP TABLE CONSTRUCTION VIA TENSOR DECOMPOSITION

(75) Inventors: Martin S. Maltz, Rochester, NY (US); Zhigang Fan, Webster, OH (US)

(73) Assignee: Xerox Corporation, Norwalk, CT (US)

( * ) Notice: Subject to any disclaimer, the term of this patent is extended or adjusted under 35 U.S.C. 154(b) by 156 days.

(21) Appl. No.: 13/451,883

(22) Filed: Apr. 20, 2012

(65) Prior Publication Data

US 2013/0114092 A1    May 9, 2013

Related U.S. Application Data

(60) Provisional application No. 61/556,352, filed on Nov. 7, 2011.

(51) Int. Cl.
| | |
|---|---|
| *G06F 15/00* | (2006.01) |
| *G06K 1/00* | (2006.01) |
| *H04N 1/60* | (2006.01) |
| *G06K 9/00* | (2006.01) |
| *G09G 5/06* | (2006.01) |

(52) U.S. Cl.
CPC .. *G06K 9/00* (2013.01); *H04N 1/60* (2013.01); *G09G 2320/0276* (2013.01); *G09G 5/06* (2013.01)
USPC .......................................................... 358/1.9

(58) Field of Classification Search
None
See application file for complete search history.

(56) References Cited

U.S. PATENT DOCUMENTS

| | | | |
|---|---|---|---|
| 5,469,267 A | 11/1995 | Wang | |
| 5,748,330 A | 5/1998 | Wang et al. | |
| 5,854,882 A | 12/1998 | Wang | |
| 6,266,157 B1 | 7/2001 | Fan et al. | |
| 6,435,654 B1 | 8/2002 | Wang et al. | |
| 7,355,752 B2 | 4/2008 | Sharma et al. | |
| 8,331,662 B2 * | 12/2012 | Monga et al. | 382/165 |
| 8,379,267 B2 * | 2/2013 | Mestha et al. | 358/1.9 |
| 2008/0218802 A1 | 9/2008 | Monga et al. | |
| 2010/0183220 A1 | 7/2010 | Monga et al. | |

OTHER PUBLICATIONS

Roger Horn & Charles Johnson, *Matrix Analysis*, Cambridge University Press, Feb. 23, 1990 ISBN-10: 0521386322 and ISBN-13: 978-0521386326; 575 pages.

Harshman, Richard A., "Foundations of the Parafac Procedure: Models and Conditions for an "Explanatory" Multimodal Factor Analysis", UCLA Working Papers in Phonetics, Dec. 1970, 84 pgs.

Tucker, Ledyard R., "Some Mathematical Notes on Three-Mode Factor Analysis" Psychometrika, 1966; vol. 31, No. 3, pp. 279-311.

Friedlander, Michael P. and Hatz, Kathrin, "Computing Nonnegative Tensor Factorizations", Department of Computer Science Technical Report TR-2006-21, 16 pages, Oct. 19, 2006, University of British Columbia.

* cited by examiner

*Primary Examiner* — Mark Zimmerman
*Assistant Examiner* — Michael Burleson
(74) *Attorney, Agent, or Firm* — Fay Sharpe LLP (57) ABSTRACT

A method and apparatus for characterizing the performance of a printing device comprising printing a target set of patches with the device and measuring the printing device response with the printed target set; compiling a LUT from the printed target set and measured response; and representing the LUT as a tensor. According to one exemplary embodiment, tensor decomposition/parallel factor analysis is employed for compacting the tensor representation of the LUT.

22 Claims, 7 Drawing Sheets

METHOD AND SYSTEM FOR IMAGING DEVICE CHARACTERIZATION INCLUDING LOOK-UP TABLE CONSTRUCTION VIA TENSOR DECOMPOSITION

This application claims priority to U.S. Provisional Patent Application No. 61/556,352 by Maltz et al., filed Nov. 7, 2011, entitled "IMAGING DEVICE COLOR CHARACTERIZATION INCLUDING COLOR LOOK-UP TABLE CONSTRUCTION VIA TENSOR DECOMPOSITION" and is incorporated herein by reference in its entirety.

CROSS REFERENCE TO RELATED PATENTS AND APPLICATIONS

U.S. Patent Application Publication No. 2010/0183220 by Monga et al., published Jul. 22, 2010 and entitled "IMAGING DEVICE COLOR CHARACTERIZATION INCLUDING COLOR LOOK-UP TABLE CONSTRUCTION VIA TENSOR DECOMPOSITION" is incorporated herein by reference it its entirety.

BACKGROUND

The presently disclosed embodiments are directed to color printing and display systems; and especially color characterization of such systems.

In today's business and scientific world, color has become essential as a component of communication. Color facilitates the sharing of knowledge and ideas. For example, companies involved in the development of digital color print engines are continuously looking for ways to improve the total image quality of their products. One of the elements that affects image quality is the ability to consistently produce the same quality image output on a printer from one day to another, from one week to the next, month after month. Colors on a printer tend to drift over time due to ink/toner variations, temperature fluctuations, type of media used, environment, etc. There has been a long felt commercial need for efficiently maintaining print color predictability, particularly as electronic marketing has placed more importance on the accurate representation of merchandise in illustrative print or display media.

Color printing characterization is a crucial task in color management. The characterization process essentially establishes a relationship between device dependent, e.g. printer CMY, and device independent, e.g. CIELAB values. Several color management tasks such as derivation of ICC profiles, color transforms for calibration, etc. benefit from an accurate mathematical characterization of the physical device. For color printers, characterization is an expensive process involving large numbers of patch measurements and subsequent computation to derive satisfactorily accurate color lookup-tables (LUTs).

Color printer characterization is the process of deriving a mathematical transform which relates printer color, e.g. CMY(K), to its corresponding device independent representation, e.g. spectral color, CIELAB, etc. The forward characterization transform defines the response of the device to a known input, thus describing the color characteristics of the device. The inverse characterization transform compensates for these characteristics and determines the input to the device that is required to obtain a desired response. For printers, a CMY(K)→CIELAB mapping represents a forward characterization transform while the CIELAB→CMY(K) map is an inverse transform. Herein the characterization color transform will be used to refer unambiguously to the forward transform; suitable inversion methods can be used to derive the corresponding inverse transform. The characterization transform is of immense value in many color management tasks such as derivation of ICC profiles for the printer, printer calibration, color control, etc.

By way of one example, to ensure accurate color reproduction for printers, characterization and calibration processes are required. The characterization procedure is often performed in-factory to create machine profiles, while the calibration procedure, which updates the profiles, may be performed in-factory by the manufacturers, or at the customer-site by users. During printer characterization and calibration, color patches are printed and measured, and the machine characteristics are determined by comparing the desired outputs and the actual measured data associated with the printed color patches. In order to precisely measure the color response of a printer covering the entire printer gamut, the conventional characterization and calibration processes print and measure a large number of color patches. The number of patches increases drastically if calibrations for multiple media, UCR/GCR strategies, and/or halftone schemes are required.

As the number of color patches is a significant factor contributing to characterization/calibration cost and time, several different methods have been employed in the past to reduce the number of color patches required to be printed and measured. One of such approaches is to replace the multi-dimensional (M>=3) LUT with a two-dimensional look-up table. Because the two dimensional LUTs are by construction smaller than three or four dimensional LUTs, for example, a patch reduction is obtained, but at the cost of color accuracy. For example, a multi-dimensional matrix representation of a LUT can be approximated by decomposition of the multi-dimensional matrix into smaller matrices. According to another approach, Principal Component Analysis (PCA) provides a color mapping function which is modeled as a linear combination of a set of eigen functions. The PCA method may drastically reduce the patches required during calibration, but its characterization process is relatively complicated and required a relatively large number of printed patches proportional to the number of nodes in the multi-dimensional LUT times the number of different possible printer states due to changes in paper, environmental conditions, aging, etc.

In a radically different approach, Wang et al. discloses a halftone independent binary printer model to obtain characterization LUTs. This approach has the powerful advantage of not repeating patch measurements as a function of halftone.

It is advantageous, and thus there is a need, to further improve color device characterization/calibration processes to reduce the number of required rendered patched while maintaining a relative measure of accuracy. This disclosure provided methods and systems to interpret multi-dimensional LUTs as tensors and apply tensor decompositions such as parallel-factor analysis to obtain compact representations of LUTs. From a mathematical viewpoint, tensor decompositions naturally unearth structure in multi-dimensional LUTs which is otherwise hard to predict. In addition, whenever a relatively compact representation of a multi-dimensional LUT/tensor is possible via parallel factors, it is equivalently possible to derive/represent the LUT with reduced effort in the sense of storage, computation and/or measurement.

INCORPORATION BY REFERENCE

U.S. Patent Application Publication No. 2008/0218802 by Monga et al., published Sep. 11, 2008 and entitled

"DEVICE CALIBRATION METHOD WITH ACCURATE PLANAR CONTROL";

U.S. Pat. No. 5,469,267 by Wang, issued Nov. 21, 1995 and entitled "HALFTONE CORRECTION SYSTEM";

U.S. Pat. No. 5,748,330 BY Wang et al., issued May 5, 1998 and entitled "METHOD OF CALIBRATING A DIGITAL PRINTER USING COMPONENT TEST PATCHES AND THE YULE-NIELSEN EQUATION";

U.S. Pat. No. 5,854,882 by Wang, issued Dec. 29, 1998 and entitled "HALFTONE CORRECTION SYSTEMS";

U.S. Pat. No. 6,266,157 by Fan et al., issued Jul. 24, 2011 and entitled "METHOD OF ERROR DIFFUSION USING 2×2 COLOR CORRECTION AND INCREMENT MATCHING";

U.S. Pat. No. 6,435,654 by Wang et al., issued Aug. 20, 2002 and entitled "COLOR CALIBRATION FOR DIGITAL HALFTONING";

U.S. Pat. No. 7,355,752 by Sharma et al., issued Apr. 8, 2008 and entitled "TWO-DIMENSIONAL CALIBRATION ARCHITECTURES FOR COLOR DEVICES";

ROGER HORN & CHARLES JOHNSON, Matrix Analysis, Cambridge University Press, Feb. 23, 1990 ISBN-10: 0521386322 and ISBN-13: 978-0521386326; 575 pages;

HARSHMAN, RICHARD A., "Foundations of the Parafac Procedure: Models and Conditions for an "Explanatory" Multimodal Factor Analysis", UCLA Working Papers in Phonetics, December 1970, 84 pages;

TUCKER, LEDYARD R., "Some Mathematical Notes on Three-Mode Factor Analysis" Psychometrika, 1966; Vol. 31, No. 3, pages 279-311; and FRIEDLANDER, MICHAEL P. AND HATZ, KATHRIN, "Computing Nonnegative Tensor Factorizations", Department of Computer Science Technical Report TR-2006-21, 16 pages, Oct. 19, 2006, University of British Columbia, are all incorporated herein by reference in their entirety.

BRIEF DESCRIPTION

In one embodiment of this disclosure, described is a method of generating a multidimensional look-up-table (LUT) including a plurality of nodes, the LUT a characterization of a color device and the multidimensional LUT mapping a plurality of device dependent color space values to a plurality of respective device independent color space values associated with the plurality of nodes, the method comprising defining the multidimensional LUT as a tensor; rendering a training set of patches with the color device, the training set of patches associated with a subset of the plurality of nodes, the training set of patches rendered for device dependent color space values associated with the subset of the plurality of nodes; measuring one or more colors associated with the rendered training set of patches to generate device independent color space values associated with respective device dependent color space values associated with the subset of the plurality of nodes; calculating one or more tensor terms associated with the tensor using the device dependent color space values and device independent color space values associated with the rendered training set of patches; and calculating the plurality of device dependent color space values to the plurality of respective device independent color space values based on the calculated one or more calculated tensor terms to generate the multidimensional LUT.

In another embodiment of this disclosure, described is a printing system comprising a controller operatively connected to the printing device, the controller configured to access a profile associated with the printing device, the profile including a profile multidimensional look-up-table (LUT), the profile LUT an inverse characterization of the printing device mapping a plurality of device independent color space values to a plurality of device dependent color space values, and the multidimensional profile LUT generated by inversing a model multidimensional characterization of the printing device, the model multidimensional characterization LUT including a plurality of nodes and mapping a plurality of device dependent color space values to a plurality of respective device independent color space values associated with the plurality of nodes, the model multidimensional characterization LUT generated by a method comprising defining the multidimensional characterization LUT as a tensor; rendering a training set of patches with the printing device, the target set of patches associated with a subset of the plurality of nodes, the training set of patches printed with the printing device for device dependent color space values associated with the subset of the plurality of nodes; measuring one or more colors associated with the printed training set of patches to generate device independent color space values associated with respective device dependent color space values associated with the subset of the plurality of nodes; calculating one or more tensor terms associated with the tensor using the device dependent color space values and device independent color space values associated with the printed training set of patches; and calculating the plurality of device dependent color space values to the plurality of respective device independent color space values based on the calculated one or more calculated tensor terms.

In still another embodiment of this disclosure, described is a controller operatively associated with a color device, the controller configured to perform a method of generating a multidimensional look-up-table (LUT) including a plurality of nodes, the LUT a characterization of a color device and the multidimensional LUT mapping a plurality of device dependent color space values to a plurality of respective device independent color space values associated with the plurality of nodes, the method comprising defining the multidimensional LUT as a tensor; rendering a training set of patches with the color device, the training set of patches associated with a subset of the plurality of nodes, the training set of patches rendered for device dependent color space values associated with the subset of the plurality of nodes; measuring one or more colors associated with the rendered training set of patches to generate device independent color space values associated with respective device dependent color space values associated with the subset of the plurality of nodes; calculating one or more tensor terms associated with the tensor using the device dependent color space values and device independent color space values associated with the rendered training set of patches; and calculating the plurality of device dependent color space values to the plurality of respective device independent color space values based on the calculated one or more calculated tensor terms to generate the multidimensional LUT.

DETAILED DESCRIPTION

The subject embodiments relate to representing look-up tables for characterizing a color device such as a printer or other imaging devices, as tensors, and then employing tensor decompositions such as parallel factor analysis methods to obtain compact representations of the LUTs. Tensors are N-way arrays or higher-dimensional generalization of matrices. Employing tensor decompositions is analogous to prior known matrix decomposition techniques having a similar objective of compacting LUT representations.

More particularly, the subject embodiments comprise first, adapting tensors to represent an n-dimensional lattice to a real number map which typically comprises a multi-dimensional color look-up table, and second, using parallel factor analysis on the LUT tensors to unearth structure in the LUTs leading to methods that can derive the LUT with reduced effort, i.e., reduce storage, computation and/or measurements in the printing device processor means.

According to this disclosure and the exemplary embodiments provided herein, multi-dimensional LUTs are interpreted as tensors and tensor decompositions/parallel-factor analysis is applied to obtain compact representations of the multi-dimensional LUTs. As an example, for a four-dimensional M×M×M×M LUT, the disclosed technique enables the number of parameters required to be reduced by a factor on the order of 100 without sacrificing significant accuracy. From a mathematical viewpoint, tensor decompositions naturally unearth structure in multi-dimensional LUTs which is otherwise hard to predict. Hence, whenever a compact representation of a multi-dimensional LUT/tensor is possible via parallel factors it is equivalently possible to derive/represent the LUT with reduced effort in the sense of storage, computation and/or measurement.

Figure 1:
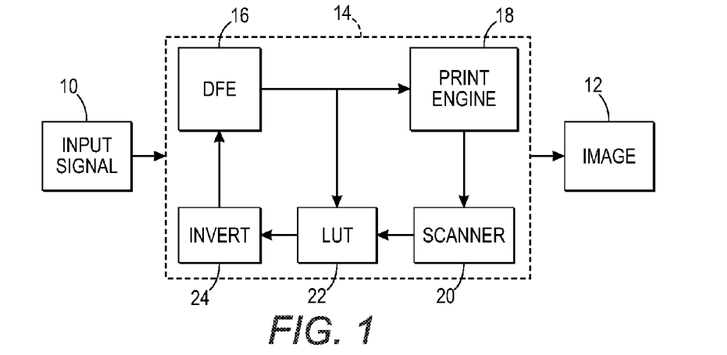
FIG. 1 is a block diagram of a printing apparatus including the subject embodiments.

With particular reference to FIG. 1, a printing apparatus according to an exemplary embodiment of this disclosure comprises a printing system 14 that processes an input signal 10 to generate a printed document 12. The printing system includes conventional hardware in that the input signal is processed by a digital front end 16 to transform the input signal and communicate the transformed signal to print engine 18 which renders a print image on document 12. The subject print engine is configured primarily for color printing. A scanner or other color measuring device 20 measures the color output of the engine for a set of test patches. The device dependent and device independent information are then combined to create the LUT 22. The printing system 14 also includes a feedback loop which inverts 24 the device dependent to device independent color LUT 22, to produce a device independent to device dependent color LUT which updates the one in the DFE 16 so that the color error associated with the printed document is within a predetermined tolerance/specification. The LUT 22 generation is the subject of this disclosure and is generated using method and systems including tensor decomposition as provided herein.

An Nth-order tensor is a mathematical object that has N indices and obeys certain transformation rules. Each index of a tensor ranges over the number of levels. Tensors are generalizations of scalars which have no indices, vectors which have exactly one index, and matrices which have exactly two indices. Tensors generally have an arbitrary number of indices.

Mathematically, a $N^{th}$ order tensor is represented as $$\tau \in R^{S_1 \times S_2 \times \ldots S_N}$$

where $\tau$ is an order-N tensor and is the integer that describes the size of the $i^{th}$ dimension of $\tau$. It is to be understood from the above definition that N=2 would make $\tau$ a matrix of size $S_1 \times S_2$.

Matrix decompositions such as the singular value decomposition (SVD) are ubiquitous in numerical analysis. The classical way of thinking about SVD is that it writes a M×N matrix A in terms of matrix factors U, D and V given as $$A_{M \times M} = U_{M \times N} D_{M \times N} V_{N \times N}$$

where D is diagonal and contains singular values $\sigma_i$'s; for a full-rank A, $\sigma_i$'s are non-zero for i=min(M,N). Further, U and V contain orthonormal columns and rows respectively. In other words, the SVD built an orthonormal basis for the row/column space of A.

An alternate perspective on the SVD, or other matrix approximations, is that A is expressed as the minimal sum of rank-1 matrices:

$$A = \sigma_1 \cdot (u_1 \circ v_1) = \sigma_2 \cdot (u_2 \circ v_2) + \ldots + \sigma_r \cdot (u_r \circ v_r)$$

where $u_1$ is in $R^M$ and $v_1$ is in $R^N$ for all i=1, 2, ... r, and r<=min(M·N) is the rank of the matrix. The operator "∘" denotes the outer product; thus the ij-th entry of the rank-1 matrix a∘b is the product of the $i^{th}$ entry of a with the $j^{th}$ entry of b, that is (a∘b)ij=$a_i b_j$.

However, extending matrix decompositions such as the SVD to higher-order tensors provides a significant mathematical challenge over conventional matrix processes. This is because conventional matrix concepts, such as rank, become ambiguous and more complicated. Tensor decompositions have been studied in tensor theory as parallel factor analysis. See R. A. Harshman, "Foundations of the PARAFAC procedure: Model and Conditions for an explanatory multi-modal factor analysis", UCLA Working Papers in Phonetics, 1970. As with matrix decompositions, the goal of tensor decompositions is to write a tensor as a sum of rank-1 tensors. Consider for example, an M×N×P tensor A. Tensor A is expressed as a sum of rank-1 third order tensors; i.e., $$A = (u_1 \circ v_1 \circ w_1) + (u_2 \circ v_2 \circ w_2) + \ldots + (u_T \circ v_T \circ w_T)$$

where $u_i$ is in $R^M$, $v_i$ is in $R^N$, $w_i$ is in $R^P$ for all i=1, 2, ..., T. As before "∘" denotes the outer product and $(a \circ b \circ c)_{ij} = a_i b_j c_k$.

Figure 2A:
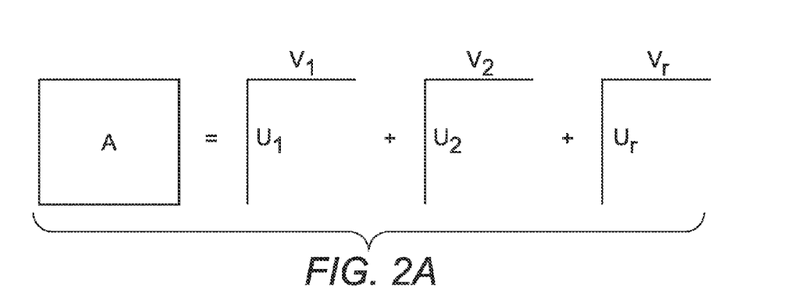
FIG. 2 is a conceptual visualization of representing order-2 and order-3 tensors by a sum of rank-1 outer products of vectors.
Figure 2B:
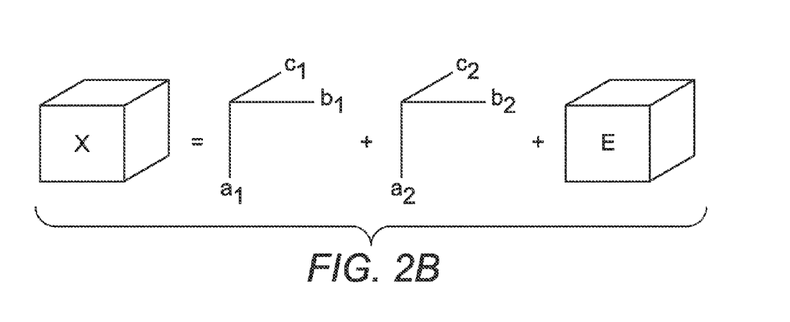

FIGS. 2A and 2B show a conceptual visualization in accordance with the above equations of approximating matrices and higher-order tensors as a sum of rank-1 tensors each of which is formed by taking outer products of vectors. Note, that an error term E is also shown for order-3 emphasizing that the decomposition is not necessarily a factorization.

The major difference between matrix decompositions relative to tensor decompositions is that for n>2, there is generally no exact reconstruction for T=M. In practice hence, the following optimization problem is solved, $$(U, V, W) = \mathrm{argmin} \left\| \mathcal{A} - \sum_{i=1}^{T} u_i \circ v_i \circ w_i \right\|$$

where u, v, w are matrices formed by stacking the respective vectors in columns and adequate accuracy is usually obtained with a small number of terms. Typically, alternate least squares type methods are employed in solving for the aforementioned optimization problem.

A multi-dimensional look-up table that maps n input variables to m output variables can be thought of as a collection of m LUTs, each of which is a map from n input variables to one output variable.

Figure 3A:
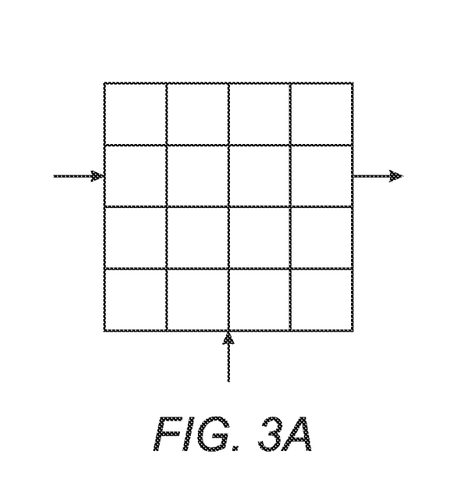
FIG. 3 is a representation of a two-dimensional, and a three-dimensional look-up table as a map from a regular lattice to a set of reals.
Figure 3B:
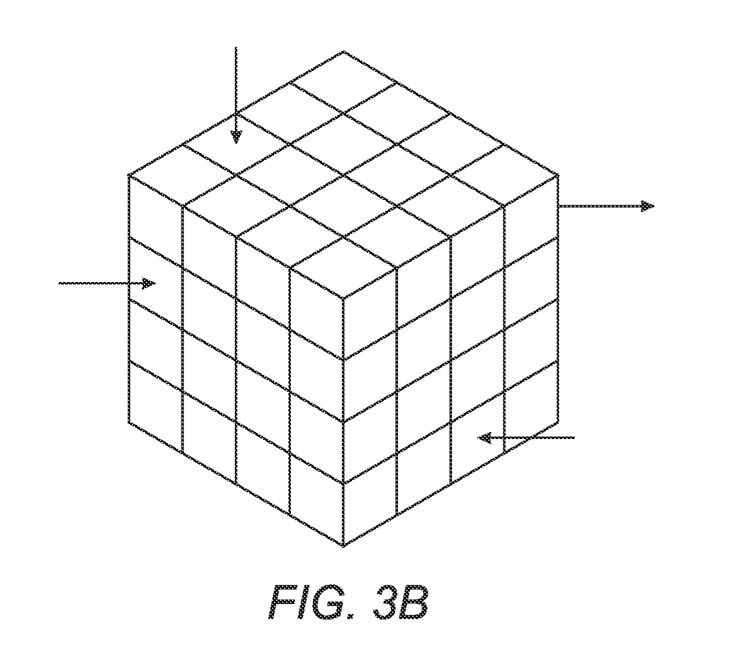

An n-dimensional LUT hence has n input variables or an n-dimensional input. FIGS. 3A and 3B show a visualization of an n-D LUT for the cases n=2, 3, respectively. As is shown in FIGS. 3A and 3B, the LUT nodes are designed to lie on a regular lattice. Define $I_i$ to be a set of real-valued levels along the $i^{th}$ dimension. A regular lattice $L^n$ in n-dimensional space is defined as the set of all points $x=[x_1, x_2, \ldots, x_n]$ whose $i^{th}$ component $x_i$ belongs to the set $l_i$. Mathematically, the lattice can be expressed as $$L^n = \{x \in R^n | x_i \in l_i, i=1, 2, \ldots n\}$$

If $S_i$ is the number of levels in $l_i$, the size of the lattice is $S_1 \times S_2 \times \ldots S_n$. The LUT is hence a map from the input lattice to all valued variables.

In fact, for ease of representation the input lattice may be thought of simply as a lattice of indices, i.e. each $x_i$ may take on a value i, where i=1, 2, ... n. In that setting, there is clearly equivalence between the $n^{th}$ order tensor definition and an n-dimensional LUT. In particular, an n-dimensional LUT with an input lattice of size $S_1 \times S_2 \times \ldots S_n$ may be interpreted as an order n tensor if the nodes of the lattice in the $i^{th}$ input coordinate are simply integers ranging from 1, 2, ... $S_i$.

A general approach to tensor decomposition is:
1) Obtain an initial estimate for a one term approximation to the tensor;
2) Improve that approximation using alternating least squares;
3) Obtain an initial estimate for the next term;
4) Improve the multi-term approximation using alternating least squares;
5) Iterate steps 3 and 4 until adequate accuracy is obtained.

To illustrate, consider a CMYK printer, and the LUT that describes the printed color for each combination of colorants the printer model. The color can be described in many possible color spaces. Using the L*a*b* space, which is essentially lightness, magentaness, and yellowness, consider the tensor that relates CMYK to the lightness, L. Using tensor decomposition, this tensor can be approximated with the expression:

$$L_{ijpm} = \sum_{t}^{T} \sigma_t c_t[i] m_t[j] y_t[p] k_t[m]$$

where $L_{ijpm}$ is an element of the L tensor, t is the term index, T is the number of terms, $c_t[i]$ is the $i^{th}$ element of the $c_t$ vector which describes the dependence of L on cyan, $m_t[j]$ is the $j^{th}$ element of the $m_t$ vector which describes the dependence of L on magenta, $y_t[p]$ is the $p^{th}$ element of the $y_t$ vector which describes the dependence of L on yellow, and $k_t[m]$ is the $m^{th}$ element of the $k_t$ vector, which describes the dependence of L on black. Also, thinking of the array of vectors, $c_t$, as the matrix C, defining the M, Y, and K matrices in a similar fashion. It is useful to normalize each vector, so $\sigma_t$ describes the magnitude of the contribution each term makes to the tensor decomposition, so the root mean square size of the elements for each vector is set to 1.

$$\text{For } c_t: S_c = \sum_{i}^{S_c} (c_t[i])^2.$$

Similar equations hold for the other vectors.

For printers, a good way to obtain the estimate for vector $c_1$ of step 1) is to average over all tensor components for each level of the $c_1$ vector. In other words:

$$c_1^u[i] = \left( \sum_{jpm}^{S_j S_p S_m} L_{ijpm} \right) \bigg/ (S_j S_p S_m)$$

where $c_1^u[i]$ is the $i^{th}$ entry in unnormalized cyan vector $c^u$. Similar equations hold for $m^u$, $y^u$, and $k^u$. To obtain the normalized vectors, the unnormalized ones are multiplied by a normalization factor so they satisfy the normalization condition specified above. To find $\sigma_1$ we minimize the squared error, $E^2$ where:

$$E^2 = \sum_{ijpm}^{S_i S_j S_p S_m} (L_{ijpm} - \sigma_1 c_1[i] m_1[j] y_1[p] k_1[m])^2$$

Next, the initial estimates are improved using alternating least squares. Initially, the unnormalized cyan vector, $c^u$, is improved by holding the other vectors constant and minimizing the squared error, $E^2$, where:

$$E^2 = \sum_{ijpm}^{S_i S_j S_p S_m} (L_{ijpm} - c_1^u[i] m_1[j] y_1[p] k_1[m])^2$$

Then $\sigma_1$ and the normalized cyan vector, $c_1$, are obtained from the unnormalized one as before. Improved estimates for $m_1$, $y_1$, and $k_1$ are obtained in a similar fashion. Then go back to $c_1$ and do it over again.

When the error stops decreasing, a term is added, and minimize $E^2$ is minimized according to the expression:

$$E^2 = \sum_{ijpm}^{S_i S_j S_p S_m} \left( L_{ijpm} - \sum_{t}^{T} \sigma_t c_t[i] m_t[j] y_t[p] k_t[m] \right)^2$$

where T=2, using alternating least squares. Initially it is guessed that all the elements of $c_2$, $m_2$, $y_2$, and $k_2$ are 1. Then an improved estimate is obtained for the C matrix by varying all the elements of the unnormalized cyan matrix, $C^u$ to minimize the $E^2$ error, where:

$$E^2 = \sum_{ijpm}^{S_iS_jS_pS_m} \left(L_{ijpm} - \sum_{t}^{T} c_t^u[i]m_t[j]y_t[p]k_t[m]\right)^2$$

which leads to the set of equations:

$$V_t[i] = H_{tt'}c_{t'}^u[i]$$

where:

$$V_t[i] = \sum_{jpm}^{S_jS_pS_m} L_{ijpm}\theta_{tjpm}$$

$$H_{tt'} = \sum_{jpm}^{S_jS_pS_m} \theta_{tjpm}\theta_{t'jpm}$$

and $$\theta_{tjpm} = m_t[j]y_t[p]k_t[m].$$

These equations are easily solved for $C^u$. Using the previously discussed normalization procedures C and $\sigma_t$ are then be found. Using similar techniques, M, Y, and K are also found. The process is then iterated until the error stops decreasing. If the error is too large, additional terms are added using the same technique until the error is satisfactory. Similar calculations are also done for the a* and b* components of the color space.

These techniques have been applied to four color (CMYK) printers which are discussed in this section. One is an inkjet printer with simple characteristics; as cyan, magenta, yellow, and black inks are added, colors always get darker. The second is a xerographic printer with a more complex response. At low levels of black toner, it behaves like the inkjet printer. At high levels of black toner, however, adding cyan, magenta, or yellow toner makes colors lighter. This makes the response of the xerographic printer relatively harder to model.

Figure 4:
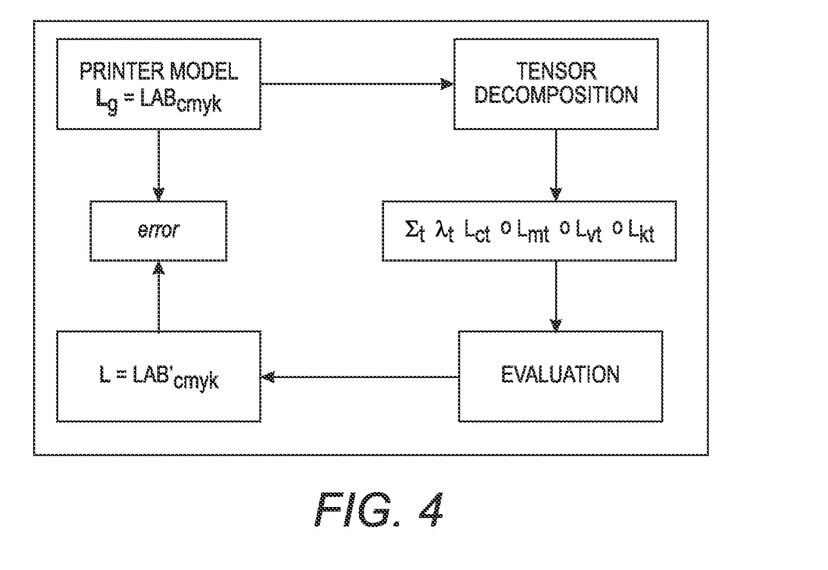
FIG. 4 is a block diagram of an exemplary process of generating and evaluating a tensor approximation of a printer model according to this disclosure.
Figure 5:
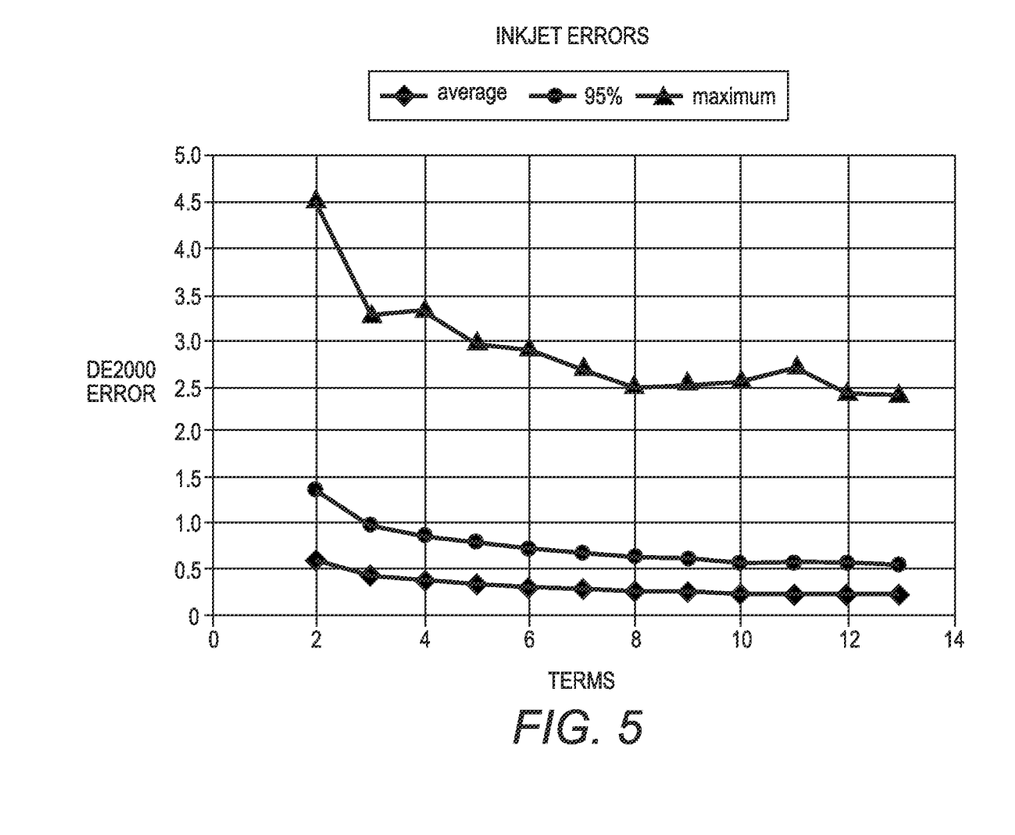
FIG. 5 illustrates DE2000 errors as a function of the number of terms for a tensor decomposition associated with an inkjet printing apparatus according to an exemplary embodiment of this disclosure.
Figure 6:
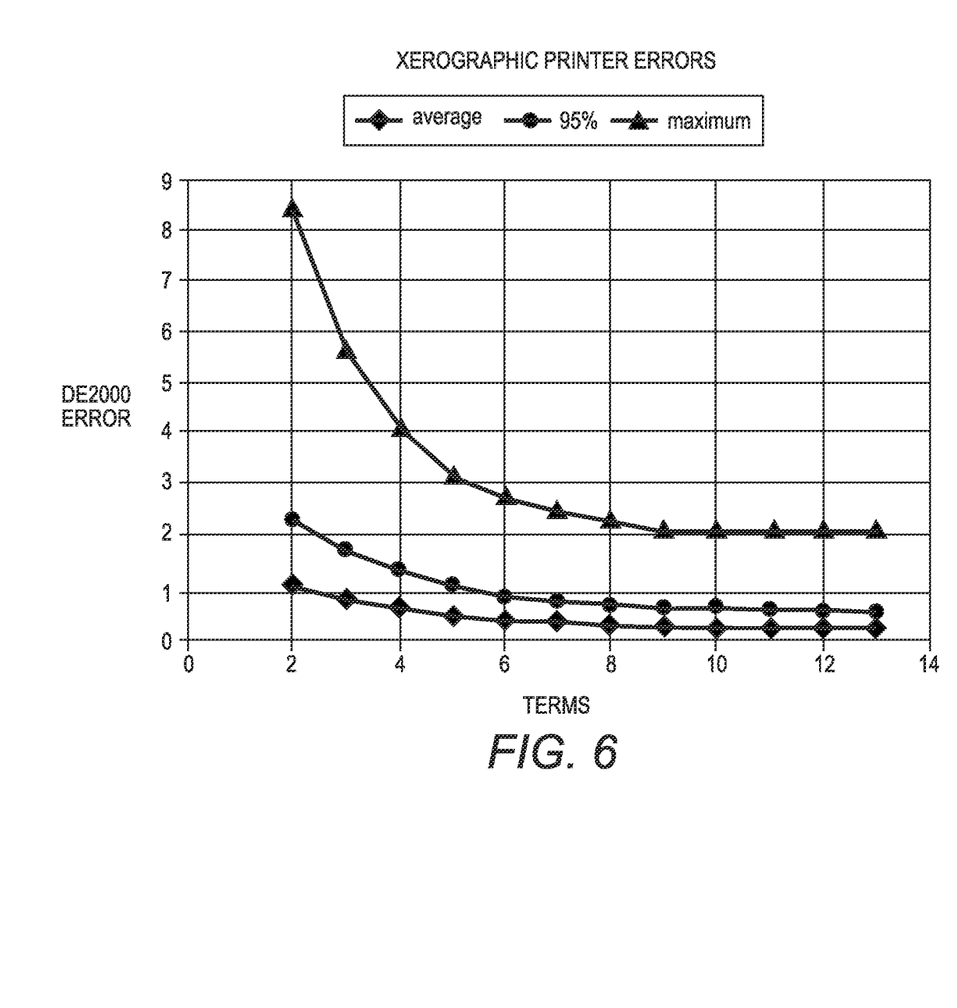
FIG. 6 illustrates DE2000 errors as a function of the number of terms for a tensor decomposition associated with a xerographic printing apparatus according to an exemplary embodiment of this disclosure.

Compact Representation:

In this section, tensor decomposition is used to get compact representations for the printer response using the previously discussed techniques. Initially, accurate 17×17×17×17 printer models are determined using a computationally expensive approach that requires spectral data, and is based on a detailed physical model of the system. The DE2000 errors, which were calculated according to the process shown in FIG. 4, are shown as a function of the number of terms in the tensor decomposition in FIG. 5 (inkjet) and FIG. 6 (xerographic printer). All 83,521 printer model nodes were used in both deriving the tensor decomposition and calculating the error.

To get a feel for the adequacy of these tensor decompositions, these results are compared with the accuracy of the printer models using the computationally expensive technique—i.e. their ability to predict the color of a printed patch. These accuracies have been found to be adequate in the past.

For the inkjet printer, typical average errors are 1, 95% errors are 2, and maximum errors are 6. For the xerographic printer, typical average errors are 1.3, 95% errors are 2.6, and maximum errors are 4. To keep all errors below their typical levels, the inkjet printer tensor decomposition needs only 2 terms, and the xerographic printer tensor decomposition needs only 5 terms. Since each term has 4×17 parameters, the tensor decomposition for the inkjet printer needs only 136 parameters, and the tensor decomposition for the xerographic printer needs only 340. Compared to the 83,521 parameters in the original tensors, this is a reduction by a factor of 614 and 246, respectively.

Reduced Input Data:

The equations used here for tensor decomposition do not require a complete set of tensor components. A suitably chosen subset of $L_{ijpm}$, $a_{ijpm}$, and $b_{ijpm}$ values are satisfactory. The tensor components must be chosen so $V_t[i]$, $V_t[j]$, $V_t[p]$, and $V_t[m]$ can be calculated, which means that every level of cyan, magenta, yellow and black must appear at least once in the list of chosen tensor components.

Several techniques have been tried for choosing the subset, and a relatively simple approach seems to work well. The steps are:

1) For each level of the cyan vector, pick N randomly chosen combinations of the magenta, yellow, and black colorants;

2) Get N formulations for each level of the magenta, yellow, and black separations using a similar technique;

3) Add formulations at the 16 corners of the CMYK hypercube; and

4) Remove duplicates.

For inkjet printers, the computationally intensive techniques require a few hundred spectral measurements to generate an accurate printer model, while for xerographic printers, with their more complicated response, about 2000 measurements are generally used. Therefore, a N is chosen that includes 420 formulations for the inkjet printer, and 2031 formulations for the xerographic printer. Tensor decompositions with varying numbers of terms were then fit to this data using the previously discussed techniques. For each tensor decomposition, a complete $17^4$ printer model was then calculated.

Figure 7:
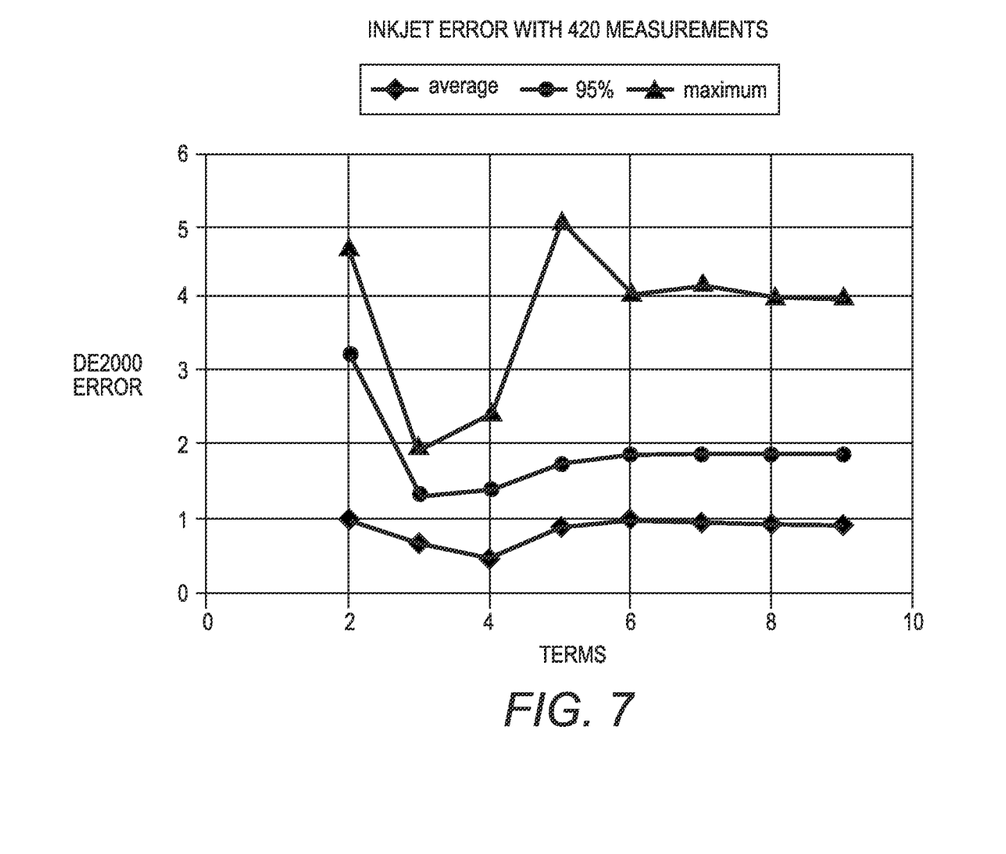
FIG. 7 illustrates DE2000 errors as a function of the number of tensors for a tensor decomposition associated with an inkjet printing apparatus using 420 measurements according to an exemplary embodiment of this disclosure.
Figure 8:
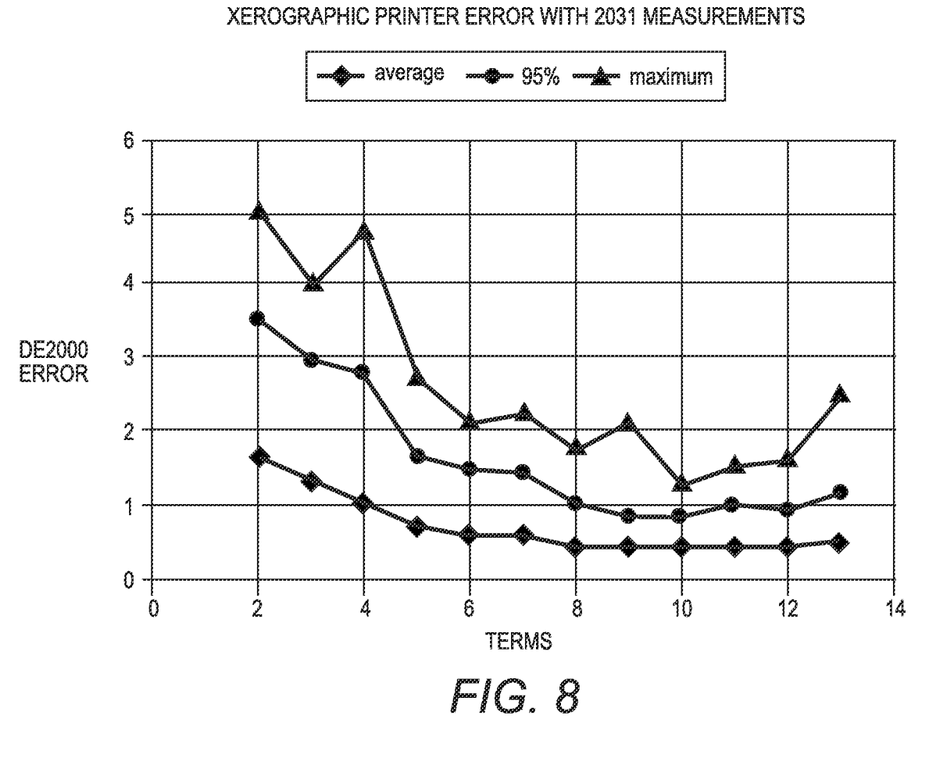
FIG. 8 illustrates DE2000 errors as a function of the number of tensors for a tensor decomposition associated with a xerographic printing apparatus using 2031 measurements according to an exemplary embodiment of this disclosure.

To test the accuracy of these estimated printer models, output colors were calculated for both the original and estimated printer models for a standard set of around 5000 CMYK formulations which provided a good sampling of CMYK space. Since these CMYK values do not fall on the nodes of the printer model, interpolation was required. A piecewise linear technique (pentahedral interpolation, a natural extension of tetrahedral interpolation) was used. The resulting differences between the colors from the original and estimated printer models were calculated. These errors are plotted in FIGS. 7 (inkjet) and 8 (xerographic printer).

For the inkjet printer, tensor decompositions with 3 and 4 terms give errors that are smaller than the typical printer model errors. The errors are larger for a smaller or larger number of terms. For a smaller number of terms, there aren't enough degrees of freedom to capture the behavior of the printer. For a larger number of terms, the system minimizes the error for the data it has by doing strange things that increase the error for the data it lacks.

For the xerographic printer, tensor decompositions with more than 5 terms give errors that are smaller than the typical printer model errors. The errors are just beginning to rise with 13 terms due to overfitting.

Now in this disclosure is provided a further description of the multidimensional lookup table of interest as a tensor and decomposing it into a sum of terms. Notably, some material may be repeated here which was previously presented, however it is provided to add clarity of the disclosed subject matter.

Each term of the tensor is the outer product of N vectors, where N is the number of input coordinates, N=4 for a CMYK printer. Each vector contains one value for each input level of the corresponding input coordinate. A common arrangement for a CMYK→LAB table, for example, would use 17 C, 17

M, 17 Y and 17 K levels. Therefore each term in the decomposition contains 68 parameters which is a relatively small number of terms used to accurately describe the corresponding CMYK to L*, a*, and b* tensors. Since the number of independent vector values is small, the values are determined from a small number of suitably chosen measurements. The first term in the decomposition is determined using an averaging technique, and additional terms are added and fit to the measurements using alternating least squares until the desired accuracy is obtained.

As previously discussed, in order to optimize the response of a printing system, normally, a model is initially generated to model it first. In many cases, the only model available is a multi-dimensional lookup table that specifies the response of the system for various levels of the input coordinates. In such cases, it would be beneficial to complete the multidimensional lookup table after making a minimum number of measurements. This disclosure provides methods/systems tensor decomposition to solve this problem.

Further explanation is now provided to use tensor decomposition to derive a CMYK→LAB printer model, however, it is to be understood that the tensor decomposition techniques provided here, as well as throughout this disclosure, can be used for describing the characteristic responses of other printer or display like systems of other systems which have outputs which are reasonably smooth function of the input coordinates. The characteristic responses may be LAB, graininess, mottle, gloss, etc.

Tensor Decomposition:

Initially, the lightness response of a printer is described with a multidimensional lookup table, L[C][M][Y][K], where C, M, Y, and K are node indices and associated with the four colorants of the subject printing system, cyan, magenta, Yellow and black. For 17 levels of C, M, Y, and K, the index values range from 0-16. CMYK digital values normally range from 0-255 during an image rendering process, so each of the index values is associated with a corresponding digital level between 0 and 255. Fitting a smooth curve through these digital value—index pairs provides a function that enables the calculation of an index value from a digital value. For an arbitrary CMYK digital formulation, the indices that result from this calculation will include fractional parts. Since lightness is only specified for integer values of C, M, Y, and K, some form of interpolation is needed to calculate lightness for an arbitrary CMYK. A piecewise linear technique (pentahedral interpolation) can be used in addition to other known interpolation techniques.

A similar approach is used for the a* and b* components of the LAB color specification, however only the lightness calculation is discussed in detail, denoting lightness by L throughout this disclosure. Notably, L corresponds to L*, however, L* can be an awkward notation.

The L[C][M][Y][K] tensor, i.e. L, is decomposed into a sum of outer products of vectors, $L_{ct}$, $L_{mt}$, $L_{yt}$, and $L_{kt}$, where t is the term index, represented as:

$$L = \Sigma_t \lambda_t L_{ct} \circ L_{mt} \circ L_{yt} \circ L_{kt} \qquad \text{Eq. 1}$$

where ○ symbolizes the outer product. An equivalent equation is:

$$L[C][M][Y][K] = \Sigma_t \lambda_t L_{ct}[C] L_{mt}[M] L_{yt}[Y] L_{kt}[K] \qquad \text{Eq. 2}$$

The vectors are normalized so the average squared value is 1. In other words, for each t:

$$N = \Sigma_C (L_{ct}[C])^2 \qquad \text{Eq. 3}$$

where N is the number of levels. The same constraint is applied to $L_{mt}$, $L_{yt}$, and $L_{kt}$. Therefore, these vectors describe the variation of the C, M, Y, and K level, and $\lambda_t$ is the magnitude of the contribution of the term.

Error Minimization:

Given a known tensor, $L_g$, it is desirable to determine the tensor decomposition that minimizes the squared error between $L_g$ and L represented as:

$$E^2 = \Sigma_{CMYK}(L_g[C][M][Y][K] - L[C][M][Y][K])^2 \qquad \text{Eq. 4}$$

Using an initial estimate for $L_{ct}$, $L_{mt}$, $L_{yt}$, and $L_{kt}$, alternating least squares is used to improve the estimate. For example, to improve the $L_{ct}$ estimate, define:

$$\Theta_t[M][Y][K] = L_{mt}[M] L_{yt}[Y] L_{kt}[K], \text{ and} \qquad \text{Eq. 5}$$

$$X_t[C] = \lambda_t L_{ct}[C] \qquad \text{Eq. 6}$$

and Eq. 4 is rewritten as:

$$E^2 = \Sigma_{CMYK}(L_g[C][M][Y][K] - \Sigma_t X_t[C] \Theta_t[M][Y][K])^2 \qquad \text{Eq. 7}$$

To minimize the error, derivatives of $E^2$ are calculated with respect to $X_t[C]$ for all t and C and set to zero. Then, a matrix equation for each C level is generated:

$$\Sigma_{MYK} L_g[C][M][Y][K] \Theta_t[M][Y][K] = \Sigma_{t'}(\Sigma_{MYK} \Theta_t[M][Y][K] \Theta_{t'}[M][Y][K]) X_{t'}[C] \qquad \text{Eq. 8}$$

which can be solved for $X_t[C]$. Using Eqs. 3 and 6, improved values for $\lambda_t$ and $L_{ct}[C]$ are calculated. This process is repeated for $L_{mt}$, $L_{yt}$, and $L_{kt}$, and then the process goes back to $L_{ct}$ and starts over again. This process is repeated until $E^2$ stops decreasing significantly.

Adding Terms:

To initialize the calculation, initially one term is added. For printer or display like systems, a reasonable initial estimate for each vector is the average response of the system for each level of the corresponding coordinate. Therefore, it can be written:

$$X_{c,t=0}[C] = \Sigma_{MYK} L_g[C][M][Y][K] \qquad \text{Eq. 9}$$

and $X_{m,t=0}[M]$, $X_{y,t=0}[Y]$, and $X_{k,t=0}[K]$ are calculated in a similar way. Then Eq. 3 is used to normalize each of these vectors, thereby determining $L_{ct}$, $L_{mt}$, $L_{yt}$, and $L_{kt}$. Then $\lambda_0$ is chosen to minimize the squared error between $L_g$ and L, which gives:

$$\lambda_0 = \Sigma_{CMYK}(L_g[C][M][Y][K] L_{c,t=0}[C] L_{mt=0}[M] L_{y,t=0}[K])/\Sigma_{CMYK}(L_{c,t=0}[C] L_{m,t=0}[M] L_{y,t=0}[Y] L_{k,t=0}[K])^2 \qquad \text{Eq. 10}$$

This estimate is then improved using alternating least squares (Eqs. 5-8).

Notably, one term is usually never enough to provide acceptable accuracy. Therefore, another term is added and alternating least squares (Eqs. 5-8) is applied as before. The process continues to add additional terms until the error is low enough to produce satisfactory results.

Needed is an estimate of the contents of each added term. One possibility is to derive the initial estimate from the residual, i.e. $L_g$-L. Alternatively, the initial estimates of 1 for all the vectors is acceptable too.

Printers:

To evaluate the quality of the results that can be obtained using tensor decomposition, it is applied to two printers with very different characteristics. One is a very well behaved solid ink jet printer. As we increase K, colors get darker and less saturated, and the trend of the changes in color for changes in C, M, and Y do not change. Adding C decreases L*, a*, and b*; adding M decreases L*, and increases a*; and adding Y increases b*.

A xerographic printer has a very different characteristic. As K is increased, colors get darker and less saturated, but the trend of the changes in color for changes in C, M, and Y change radically. At low K, the machine behaves like the ink jet printer. At high K, it behaves in a different manner, where adding either C, M, or Y increases L*. Therefore, for K=0, CMY=255 is much darker than CMY=0, while at K=255, CMY=255 is much lighter than CMY=0. Therefore, as K increases the CMY response turns inside out. For one specific K value, generally about 230, the L* value for the CMY=255 and CMY=0 colors are equivalent. For this specific value of K, the colors produced for all combinations of CMY lie in a pancake shaped region, and there are many possible CMY combinations for any given color.

Tensor Approximation:

Initially, a full printer model for Lg is used, and tensor decomposition is used to approximate the printer model using different numbers of terms. The evaluation procedure is shown in FIG. 4. The full printer model is produced by an accurate physics based regression technique (PBRT). The error statistics are calculated for the differences between the L*a*b* value at each node of the original printer model, and the corresponding L*a*b* is determined by evaluating tensor decompositions with different numbers of terms.

Limited Data Sets:

Since relatively few parameters are needed to accurately describe printer models using tensor decomposition, only a small number of measurements are required to determine the parameters. Since the algorithm does not need to know the L*a*b* values for all the nodes in Lg, as it will try to fit the L*a*b* values that are available, it is interesting to see how well it does when only L*a*b* values for a subset of these nodes is used.

From Eq. 8 it can be seen that every level of every input coordinate must appear in at least one measurement. There are many ways of picking CMYK formulations for measurement that satisfy this constraint. A simple approach that works well is:

1. For each level of each colorant pick R random combinations of levels for the remaining colorants;
2. Also include the corners of CMYK space;
3. Eliminate duplicates; and
4. Measure the printer response for each colorant formulation.

Using this approach, tensor decomposition characterization targets were printed and measured using a Xerox DC8000. This engine was chosen for its availability. It behaves like an inkjet or xerographic printer for K=0. For K=255, CMY additions do not change the printed colors very much, leading to a highly degenerate region at the bottom of the gamut.

The printer models were evaluated by printing an independent set of CMYK formulations, and comparing the colors of the print with the colors predicted using the printer model. The tensor decomposition results were compared with results obtained using a physics based regression technique (PBRT). PBRT targets must satisfy a number of constraints, so two standard targets were used here. The high resolution patch set includes 1874 patches, while the default set includes 336 patches. To achieve a comparable number of tensor decomposition patches, the target generation algorithm was run with R=44 (2199 patches) and R=5 (273 patches). The printer models had 13 levels of C, M, Y, and K.

Both printer model building techniques are subject to noise. To mitigate the effects of this noise, PBRT applies a smoothing algorithm to the printer model before putting it out. Therefore the same smoothing algorithm was used for tensor decomposition. The results were:

TABLE 1

|  | average | 95% | max |
| --- | --- | --- | --- |
| High res - PBRT | 1.40 | 2.68 | 4.43 |
| High res - tensor decomposition 8 terms | 1.51 | 2.59 | 3.65 |
| Low res - PBRT | 1.47 | 3.05 | 6.13 |
| Low res - tensor decomposition 3 terms | 3.39 | 7.52 | 15.0 |

For the high resolution targets, the errors between the two techniques are comparable. For the low resolution target, the tensor decomposition errors are about 2.4 times greater than the PBRT errors. However 1. Tensor decomposition is more generally applicable. PBRT uses a detailed physical model.
2. Tensor decomposition uses L*a*b* data. Fastcalib's detailed physical model requires spectral data.
3. The tensor decomposition calculation is much faster, i.e. seconds vs. minutes.

The word "printer" as used herein encompasses any apparatus, such as a digital copier, bookmaking machine, facsimile machine, multi-function machine, etc. which performs a print outputting function for any purpose.

In this disclosure, we have applied tensor decomposition to construct multi-dimensional lookup tables that predict the response of CMY and CMYK printers, according to one exemplary embodiment, with satisfactory accuracy using a practical number of L*a*b* measurements. Tensor decomposition runs much faster than the computationally intensive physical models that are available for these systems, and also can be used in cases where no accurate physical model is available.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of generating a multidimensional look-up-table (LUT) including a plurality of nodes, the LUT a characterization of a color device and the multidimensional LUT mapping a plurality of device dependent color space values to a plurality of respective device independent color space values associated with the plurality of nodes, the method comprising:

defining the multidimensional LUT as a tensor;

rendering a training set of patches with the color device, the training set of patches associated with a subset of the plurality of nodes, the training set of patches rendered for device dependent color space values associated with the subset of the plurality of nodes;

measuring one or more colors associated with the rendered training set of patches to generate device independent color space values associated with respective device dependent color space values associated with the subset of the plurality of nodes;

calculating one or more tensor terms associated with the tensor using the device dependent color space values and device independent color space values associated with the rendered training set of patches; and calculating the plurality of device dependent color space values to the plurality of respective device independent color space values based on the calculated one or more calculated tensor terms to generate the multidimensional LUT, wherein the process of defining the multidimensional LUT as a tensor includes:
  a) obtaining an initial estimate for a one term approximated to the tensor:
  b) improving the one term approximation to the tensor using alternating least squares;
  c) obtaining an initial estimate for a next term associated with a multi-term approximation to the tensor; and
  d) improving the multi-term approximation using alternating least squares.

2. The method of generating a multidimensional LUT according to claim 1, wherein the tensor is decomposed to calculate the one or more tensor terms.

3. The method of generating a multidimensional LUT according to claim 2, wherein parallel factor analysis is used to decompose the tensor.

4. The method of generating a multidimensional LUT according to claim 1, wherein the plurality of nodes are associated with a regular lattice structure.

5. The method of generating a multidimensional LUT according to claim 1, wherein the multidimensional LUT is a characterization of one of color rendering, mottle, graininess and gloss associated with a printing device.

6. The method of generating a multidimensional LUT according to claim 1, wherein the device is one of a printer and a display.

7. The method of generating a multidimensional LUT according to claim 1, wherein the device is a printer, the plurality of device independent color space values are associated with one of a L*a*b*, sRgb, Adobe RGB color spaces, and the plurality of device dependent color space values are associated with one of CMY, CMYK, CMYKOV color spaces.

8. The method of generating a multidimensional LUT according to claim 1, further comprising:
  e) iteratively performing steps c) and d) until a predetermined accuracy is obtained.

9. A method of generating a multidimensional look-up-table (LUT) including a plurality of nodes, the LUT a characterization of a color device and the multidimensional LUT mapping a plurality of device dependent color space values to a plurality of respective device independent color space values associated with the plurality of nodes, the method comprising:

defining the multidimensional LUT as a tensor;
rendering a training set of patches with the color device, the training set of patches associated with a subset of the plurality of nodes, the training set of patches rendered for device dependent color space values associated with the subset of the plurality of nodes;
measuring one or more colors associated with the rendered training set of patches to generate device independent color space values associated with respective device dependent color space values associated with the subset of the plurality of nodes;
calculating one or more tensor terms associated with the tensor using the device dependent color space values and device independent color space values associated with the rendered training set of patches; and
calculating the plurality of device dependent color space values to the plurality of respective device independent color space values based on the calculated one or more calculated tensor terms to generate the multidimensional LUT, wherein the subset of the plurality of nodes includes at least one occurrence of every level of color separation associated with the plurality of nodes.

10. A printing system comprising:
a printing device and;
a controller operatively connected to the printing device, the controller configured to access a profile associated with the printing device, the profile including a profile multidimensional look-up-table (LUT), the profile LUT an inverse characterization of the printing device mapping a plurality of device independent color space values to a plurality of device dependent color space values, and the multidimensional profile LUT generated by inversing a model multidimensional characterization of the printing device, the model multidimensional characterization LUT including a plurality of nodes and mapping a plurality of device dependent color space values to a plurality of respective device independent color space values associated with the plurality of nodes, the model multidimensional characterization LUT generated by a method comprising:

defining the multidimensional characterization LUT as a tensor;
rendering a training set of patches with the printing device, the target set of patches associated with a subset of the plurality of nodes, the training set of patches printed with the printing device for device dependent color space values associated with the subset of the plurality of nodes;
measuring one or more colors associated with the printed training set of patches to generate device independent color space values associated with respective device dependent color space values associated with the subset of the plurality of nodes;
calculating one or more tensor terms associated with the tensor using the device dependent color space values and device independent color space values associated with the printed training set of patches; and
calculating the plurality of device dependent color space values to the plurality of respective device independent color space values based on the calculated one or more calculated tensor terms, wherein the process of defining the multidimensional LUT as a tensor includes:
  a) obtaining an initial estimate for a one term approximated to the tensor;
  b) improving the one term approximation to the tensor using alternating least squares;
  c) obtaining an initial estimate for a next term associated with a multi-term approximation to the tensor; and
  d) improving the multi-term approximation using alternating least squares.

11. The printing system according to claim 10, wherein the tensor is decomposed to calculate the one or more tensor terms.

12. The printing system according to claim 11, wherein parallel factor analysis is used to decompose the tensor.

13. The printing system according to claim 10, wherein the plurality of nodes are associated with a regular lattice structure.

14. The printing system according to claim 10, wherein the model multidimensional characterization LUT is associated with one of color rendering, mottle, graininess and gloss associated with the printing device.

15. The printing system according to claim 10, wherein the printing device is one of a xerographic printer and an ink jet printer.

16. The printing system according to claim 10, wherein the plurality of device independent color space values are associated with one of L*a*b*, CIELAB color spaces and the plurality of device dependent color space values are associated with one of CMY, CMYK, CMYKOV color spaces.

17. The printing system according to claim 10, further comprising:
   e) iteratively performing steps c) and d) until a predetermined accuracy is obtained.

18. A printing system comprising:
   a printing device and;
   a controller operatively connected to the printing device, the controller configured to access a profile associated with the printing device, the profile including a profile multidimensional look-up-table (LUT), the profile LUT an inverse characterization of the printing device mapping a plurality of device independent color space values to a plurality of device dependent color space values, and the multidimensional profile LUT generated by inversing a model multidimensional characterization of the printing device, the model multidimensional characterization LUT including a plurality of nodes and mapping a plurality of device dependent color space values to a plurality of respective device independent color space values associated with the plurality of nodes, the model multidimensional characterization LUT generated by a method comprising:
   defining the multidimensional characterization LUT as a tensor;
   rendering a training set of patches with the printing device, the target set of patches associated with a subset of the plurality of nodes, the training set of patches printed with the printing device for device dependent color space values associated with the subset of the plurality of nodes;
   measuring one or more colors associated with the printed training set of patches to generate device independent color space values associated with respective device dependent color space values associated with the subset of the plurality of nodes;
   calculating one or more tensor terms associated with the tensor using the device dependent color space values and device independent color space values associated with the printed training set of patches; and
   calculating the plurality of device dependent color space values to the plurality of respective device independent color space values based on the calculated one or more calculated tensor terms,
   wherein the subset of the plurality of nodes includes at least one occurrence of every level of color separation associated with the plurality of nodes.

19. A system including a controller and a color device, the controller configured to perform a method of generating a multidimensional look-up-table (LUT) including a plurality of nodes, the LUT a characterization of a color device and the multidimensional LUT mapping a plurality of device dependent color space values to a plurality of respective device independent color space values associated with the plurality of nodes, the method comprising:
   defining the multidimensional LUT as a tensor;
   rendering a training set of patches with the color device, the training set of patches associated with a subset of the plurality of nodes, the training set of patches rendered for device dependent color space values associated with the subset of the plurality of nodes;
   measuring one or more colors associated with the rendered training set of patches to generate device independent color space values associated with respective device dependent color space values associated with the subset of the plurality of nodes;
   calculating one or more tensor terms associated with the tensor using the device dependent color space values and device independent color space values associated with the rendered training set of patches; and
   calculating the plurality of device dependent color space values to the plurality of respective device independent color space values based on the calculated one or more calculated tensor terms to generate the multidimensional LUT,
   wherein the process of defining the multidimensional LUT as a tensor includes:
   a) obtaining an initial estimate for a one term approximated to the tensor;
   b) improving the one term approximation to the tensor using alternating least squares;
   c) obtaining an initial estimate for a next term associated with a multi-term approximation to the tensor; and
   d) improving the multi-term approximation using alternating least squares.

20. The controller according to claim 19, wherein the tensor is decomposed to calculate the one or more tensor terms, and parallel factor analysis is used to decompose the tensor.

21. The controller according to claim 19, further comprising:
   e) iteratively performing steps c) and d) until a predetermined accuracy is obtained.

22. A system including a controller and a color device, the controller configured to perform a method of generating a multidimensional look-up-table (LUT) including a plurality of nodes, the LUT a characterization of a color device and the multidimensional LUT mapping a plurality of device dependent color space values to a plurality of respective device independent color space values associated with the plurality of nodes, the method comprising:
   defining the multidimensional LUT as a tensor;
   rendering a training set of patches with the color device, the training set of patches associated with a subset of the plurality of nodes, the training set of patches rendered for device dependent color space values associated with the subset of the plurality of nodes;
   measuring one or more colors associated with the rendered training set of patches to generate device independent color space values associated with respective device dependent color space values associated with the subset of the plurality of nodes;
   calculating one or more tensor terms associated with the tensor using the device dependent color space values and device independent color space values associated with the rendered training set of patches; and
   calculating the plurality of device dependent color space values to the plurality of respective device independent color space values based on the calculated one or more calculated tensor terms to generate the multidimensional LUT,
   wherein the subset of the plurality of nodes includes at least one occurrence of every level of color separation associated with the plurality of nodes.

* * * * *